United States Patent [19]

Duffy et al.

[11] Patent Number: 4,653,012

[45] Date of Patent: Mar. 24, 1987

[54] DISPLAY SYSTEMS

[75] Inventors: Edward P. Duffy, Hertfordshire; Geoffrey B. Craggs; David McGlade, both of Kent, all of England

[73] Assignee: Marconi Avionics Limited, England

[21] Appl. No.: 640,970

[22] Filed: Aug. 15, 1984

[30] Foreign Application Priority Data

Aug. 19, 1983 [GB] United Kingdom ............... 8322438

[51] Int. Cl.$^4$ .............................................. G06F 15/50
[52] U.S. Cl. ................................... 364/518; 340/995; 364/424; 364/521
[58] Field of Search ............... 364/424, 518, 521, 522; 340/988–990, 992, 995, 996, 709, 731

[56] References Cited

U.S. PATENT DOCUMENTS

| 4,245,321 | 1/1981 | Gennetten | 364/521 |
| 4,504,913 | 3/1985 | Miura et al. | 364/424 X |
| 4,513,377 | 4/1985 | Hasebe et al. | 364/424 X |
| 4,535,335 | 8/1985 | Tagami et al. | 364/424 X |

FOREIGN PATENT DOCUMENTS

| 0082760 | 12/1982 | European Pat. Off. |
| 0139095 | 7/1984 | European Pat. Off. |
| 2070399 | 2/1981 | United Kingdom |
| 2091526 | 1/1982 | United Kingdom |
| 2130855 | 11/1982 | United Kingdom |
| 2115660 | 1/1983 | United Kingdom |

Primary Examiner—Errol A. Krass
Assistant Examiner—H. R. Herndon
Attorney, Agent, or Firm—Kirschstein, Kirschstein, Ottinger & Israel

[57] ABSTRACT

A display system including a display device, a storage means having an array of storage locations each location being adapted to contain data representing a visual parameter of a different pixel of a picture to be displayed, and signal generating means for causing the display device to use the data to display a picture. the storage means is adapted to store data relating to a picture of a larger area than the picture displayed at any one time, the generating means incorporating means for altering the locations in the storage means which are addressed to produce the picture displayed in dependence on the required portion of the larger area picture which it is required to display.

12 Claims, 3 Drawing Figures

DISPLAY SYSTEMS

BACKGROUND OF THE INVENTION

This invention relates to display systems.

More particularly the invention relates to display systems of the kind utilising a display device for producing a display of raster scan format; a storage means having an array of storage locations, each location being adapted to contain data representing a visual parameter of a different pixel of a picture to be displayed by the display device; and signal generating means for applying to the display device a signal in which successive portions respectively represent data stored in different locations of the storage device, the sequence of the data in said signal corresponding to the raster scan format of the display picture.

In such a system the data is normally stored in the storage means in a configuration corresponding to the format of the displayed picture so that there is a one-to-one positional correspondence between the storage locations and the pixels of the displayed picture.

In some applications of such a display system, e.g. in a vehicle moving map display system, the picture to be displayed by the system is part of a larger picture and it is required that the portion of the larger picture which is displayed is slightly changed from time to time.

Thus in a vehicle moving map display system, a portion of a large map is displayed and the displayed portion of the large map is required to change progressively with vehicle movement.

Where there is a one-to-one positional correspondence between each storage location and the pixels of the displayed image, for each such change in the displayed picture the data in each storage location of the storage device has to be changed, and it is not practicable to change the data sufficiently quickly to produce a smoothly moving display.

SUMMARY OF THE INVENTION

It is an object of the present invention to provide a display system wherein this difficulty is overcome.

According to the present invention in a display system of the kind specified the storage means is adapted to store data relating to a picture of a larger area than the picture displayed at any one time, and said generating means incorporates means for altering the locations in the storage means which are addressed to produce said signal in dependence on the required portion of said picture of larger area which it is required to display on the display device.

Preferably the storage means is of toroidal form so that the picture which the data in the storage means represents may be progressively changed without changing the location in the storage means of any data remaining in the store means after such a change.

A particular advantage of a system according to the present invention is that rotational movements of the displayed picture relative to the larger area picture can be achieved as well as translational movements.

In one particular display system in accordance with the invention said storage means comprise a plurality of discrete storage devices and said data is distributed among said storage devices such that data corresponding to adjacent pixels of the larger area picture are stored in different devices.

In such a particular device system in which there are $n^2$ storage devices preferably said stored data is distributed so that the data representing pixels of each line of each set of n successive lines of said picture of larger area are distributed among a different set of n of the storage devices, the sequence of n storage devices containing data representing successive pixels of a line being full and regular along each line, and the sequence of n sets of storage devices containing data representing the pixels of n containing lines being full and regular throughout said picture.

BRIEF DESCRIPTION OF DRAWINGS

One display system in accordance with the invention will now be described, by way of example only, with reference to the accompanying drawings in which.

DETAILED DESCRIPTION OF PREFERRED EMBODIMENTS

The system is intended for use in a vehicle for producing a display of a selected rectangular portion of a map on a display device 17, the displayed map portion being arranged to change as the vehicle moves.

Figure 1:
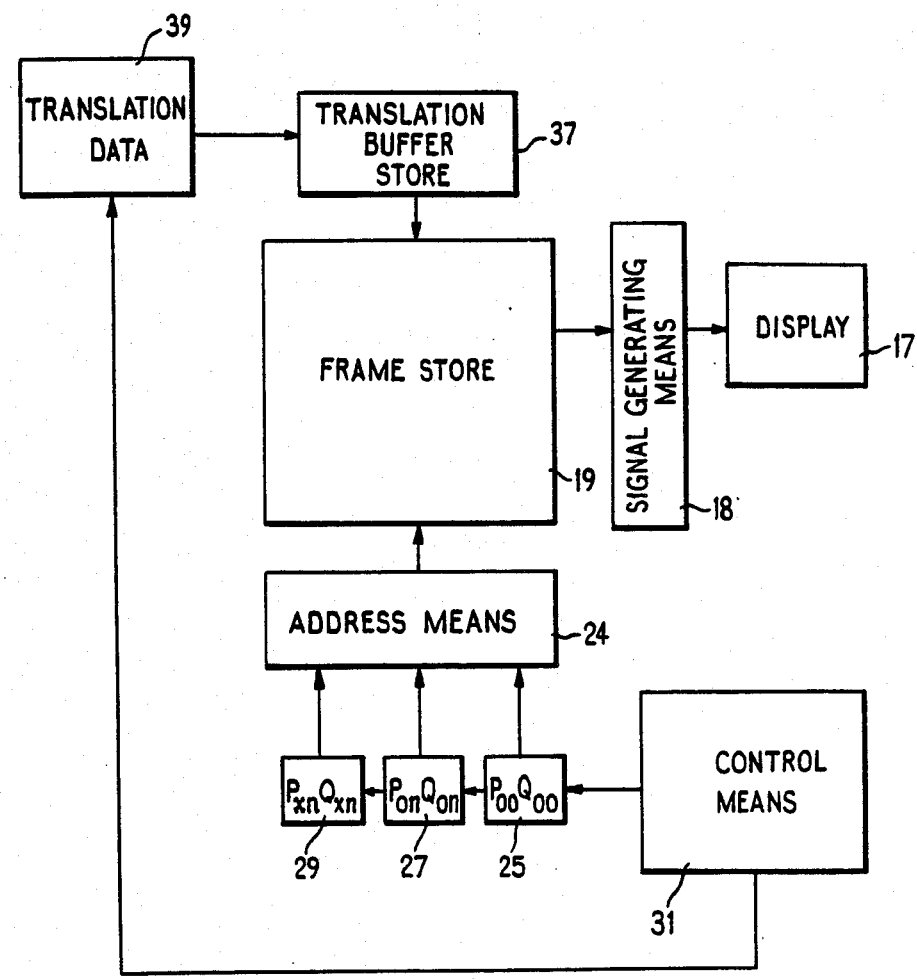
FIG. 1 is a schematic diagram of the system.

Referring to FIG. 1, the display device 17, suitable a cathode ray tube, is supplied with a video signal of raster scan format by a signal generating means 18. The signal generating means produces the video signal using data stored in a frame store 19, which comprises an array of storage locations, each location containing data representing colour and/or brightness of a different pixel on the map. The frame store 19 is effectively in the form of a 2-dimensional circular buffer, i.e. a toroid, in which the top and bottom of the store are adjacent, as are the left and right hand sides of the store.

Figure 2:
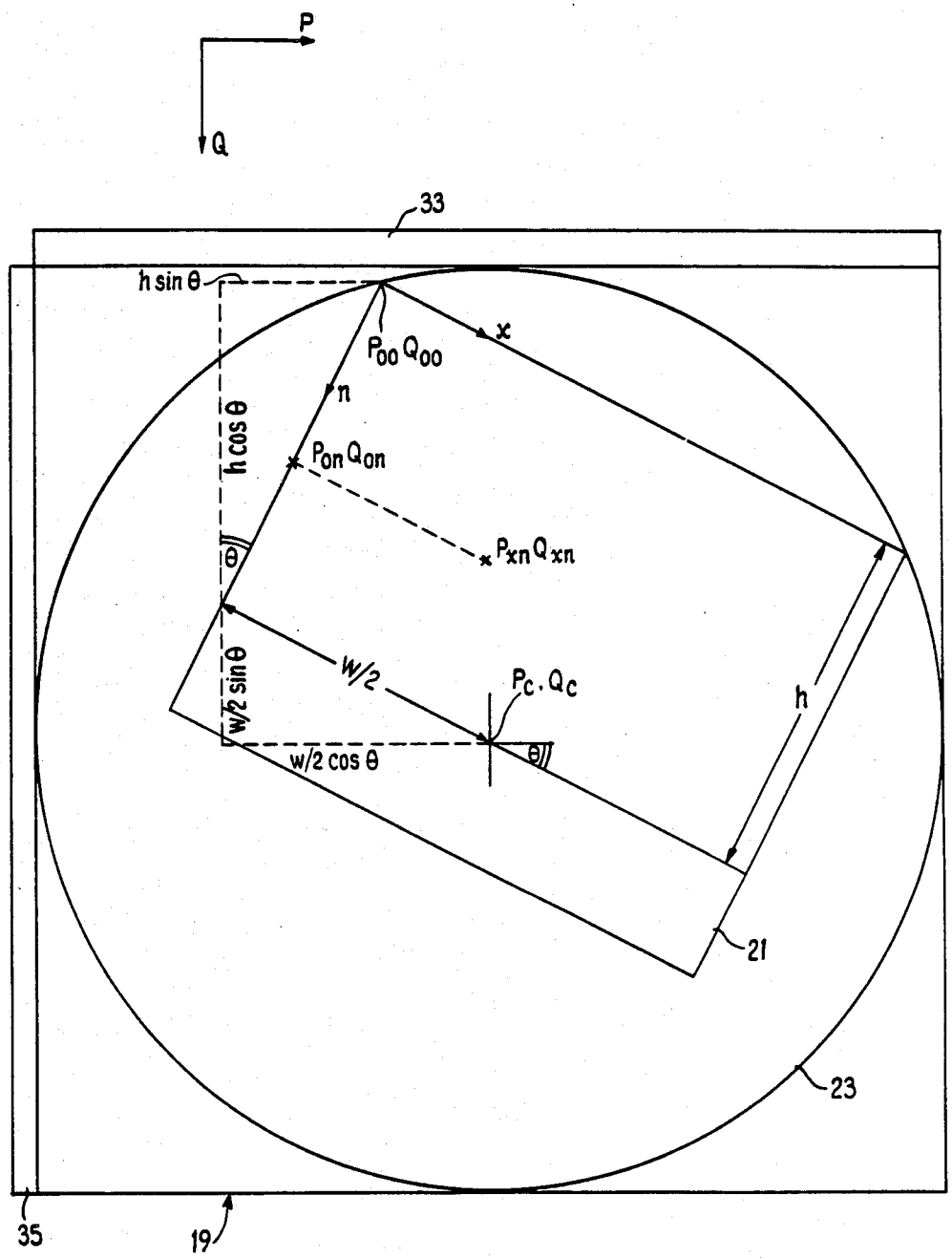
FIG. 2 is a two dimensional representation of a frame store for use in the system.

Referring now also to FIG. 2, the data in the frame store 19 corresponding to the pictures to be displayed on the display device 17 at any one time may be considered as being contained within an effective area 21 within the frame store. The frame store 19 is of dimensions such as to allow the area 21 to be rotated about a location $P_cQ_c$ in the frame store, the total frame store area used in this way by a complete rotation of the area 21 being indicated by the circle 23. The system also includes frame store address means 24, together with calculating means 25, 27, 29 under the control of a control means 31. These features provide the system with the capability of allowing the portion of the map displayed on the display device 17 to be rotated as described in more detail hereafter. In the example, two one pixel wide borders 33, 35 not containing map data are provided in the frame store 19, those borders being provided to allow the portion of the map displayed on the display device to be moved translationally over the map, as also described hereafter, the borders being loadable with data from a buffer store 37, which is in turn loadable from a data base 39.

The locations in the frame store 19 which are required to be addressed to obtain a display of the map portion represented by the data in an area 21 of the frame store 19 at an angle $\theta$ about the point $P_cQ_c$, as illustrated in FIG. 2, are calculated as follows: As can readily be seen with the aid of the dashed construction lines shown in FIG. 2, the co-ordinates $P_{oo}$, $Q_{oo}$ of the address in the frame store of the data required for the pixel at the start of the top raster line of the required display are given by the expressions:

$$P_{oo} = P_c - w/2 \cdot \cos\theta - h \cdot \sin\theta$$

$$Q_{oo} = Q_c + w/2 \cdot \sin\theta - h \cdot \cos\theta$$

where w represents the width of the area 21 and h represents the height above the centre of rotation $P_c$, $Q_c$ of the top of the area. The start addresses for each succeeding raster line $P_{on}$, $Q_{on}$ are similarly given by the expressions:

$$P_{on} = P_{oo} + n \cdot \sin\theta$$

$$Q_{on} = Q_{oo} + n \cdot \cos\theta$$

The addresses of each succeeding pixel $P_{nx}$, $Q_{nx}$ in each raster line are given by the expressions:

$$P_{xn} = P_{on} + x \cdot \cos\theta$$

$$Q_{xn} = Q_{on} - x \cdot \sin\theta$$

As the electron beam of the display device 17 scans along a raster line to produce a picture the addresses $P_{oo}$, $Q_{oo}$, $P_{on}$, $Q_{on}$ and $P_{xn}$, $Q_{xn}$ of the locations in the frame store 19 which are required to be addressed by the address means 24 to enable the signal generating means 18 to generate the required video signal are calculated by the calculating means 25, 27, 29 respectively under the control of the control means 31. The address $P_{oo}$, $Q_{oo}$ of the scan origin must be calculated once per display device field, the start addresses of each succeeding raster line $P_{on}$, $Q_{on}$ once per line, and the address of each succeeding pixel $P_{nx}Q_{nx}$ once per pixel. The calculating means 25, 27 are therefore suitably hardware, or a display device synchronised processor. However, the calculating means 29 must of necessity be a hardware addition means due to the speed required. Thus by the generation of new memory location addresses as described above using different values for $\theta$, the portion of the map to be displayed may be rotated over the map without changing the data stored in any location of the frame store.

If translation of the portion of the map displayed over the map is required, this may be achieved simply by appropriately changing the point $P_cQ_c$, i.e. appropriately changing the location in the frame store which is addressed to obtain data for the pixel corresponding to the point $P_cQ_c$. At the same time, to maintain the location in the frame store corresponding to the point $P_cQ_c$ at the centre of the stored portion of the map, new map data is loaded into the borders 33 and 35, as required, and the data corresponding to the row or column of pixels on the side of the stored portion of the map opposite the new data is dumped to provide a new border empty of data. This may be done during the field blank period of the scan by loading data from the buffer store 37 which has been filled from the translation data base 39 under the control of the control means 31. Borders of one pixel wide are sufficient to give a translation rate of one line per field, this corresponding to a complete field translation in six seconds with a 625-line/50 Hz raster scan format.

It will be appreciated that the map translation is typically carried out so that the point $P_cQ_c$ always corresponds to the position on the displayed map at which the vehicle in which the system is used is located. Similarly, the map rotation may be carried out so that the up direction on the display always corresponds to the direction the vehicle is heading.

Figure 3:
FIG. 3 illustrates the individual memory devices making up the store of FIG. 2.
Figure 3:
Figure 3:
Figure 3:

Because of the large size of the memory array used in the frame store 19 dynamic RAM devices are particularly suitable due to their high bit density. In order to use these relatively slow devices in the frame store where it is required to read out data at 15 MHz corresponding to a 625 line/50 Hz display device it is necessary to arrange the devices such that each device is not required to provide data more often than about every three or four pixel periods. FIG. 3 illustrates a memory partitioning arrangement including 16 RAM devices, designated 1 to 16 respectively which are arranged such that data corresponding to adjacent pixels of the map are stored in different devices and each device will generally only be accessed every four pixels. A typical track through the memory locations is also shown in the Figure, typical access times for two of the devices also being indicated in the Figure. In some cases it will be required to obtain two successive read outs from the same location of the same device, this being shown with respect to device 14. This may be dealt with by holding the output data from the first access either on a latch or on the device outputs, and ignoring the second access.

It will be appreciated that whilst the invention has particular application in the display of a map, it is equally applicable to any display system in which data corresponding to the pixels of a picture to be displayed is stored in a storage means.

We claim:

1. A display system comprising: a display device for producing a display in response to an applied signal of raster scan format, storage means including an array of storage locations each of which contains data representing a visual parameter of a different pixel of a picture of a larger area than a picture displayed by the display means at any one time; signal generating means for applying to said display device a signal in which successive portions respectively represent the data stored in different locations of said storage means, thereby to apply to said display device a signal of raster scan format representing said displayed picture; and, incorporated in said signal generating means, means for altering the locations in said storage means which are addressed to produce said signal, thereby to alter the displayed picture; said storage means having a plurality of discrete storage devices and said data being distributed among said storage devices so that data corresponding to adjacent pixels of said picture of larger area are stored in different said storage devices.

2. A display system according to claim 1 in which the storage means is of toroidal form so that the picture which the data in the storage means represents may be progressively changed without changing the location in the storage means of any data remaining in the storage means after such a change.

3. A display system according to claim 2 in which said array of storage locations includes an input region of empty storage locations into which new data may be read when said picture is changed.

4. A display system according to claim 3 including means for causing data stored in the region of the array opposite said input region to be dumped when said new data is read into said input region of empty storage locations so as to form a new said input region of empty storage locations.

5. A display system according to claim 1 wherein: said displayed picture is a rectangular portion of said picture of larger area which portion has a width w and a top at a distance h above a point having co-ordinates $P_c$, $Q_c$; and, to effect rotation of said displayed picture through an angle $\theta$ about said point, said means for altering comprises means for calculating in turn the address of each location in the storage means to be addressed in using said co-ordinates $P_c$, $Q_c$, and $\theta$, h and w.

6. A system according to claim 5 wherein said generating means for calculating calculates the address $P_{oo}$-$Q_{oo}$ of the data required for the pixel at the state of the top raster line of the picture to be displayed using the expressions:

$$P_{oo} = P_c - w/2 \cdot \cos\theta - h \cdot \sin\theta$$

$$Q_{oo} = Q_c + w/2 \cdot \sin\theta - h \cdot \cos\theta,$$

calculates the start address $P_{on}$, $Q_{on}$ of each succeeding raster line using the expressions:

$$P_{on} = P_{oo} + n \cdot \sin\theta$$

$$Q_{on} = Q_{oo} + n \cdot \cos\theta$$

and calculates the address $P_{xn}$, $Q_{xn}$ of each succeeding pixel in each raster line using the expressions:

$$P_{xn} = P_{on} + x \cdot \cos\theta$$

$$Q_{xn} = Q_{on} - x \cdot \sin\theta$$

7. A display system according to claim 5 for use in a vehicle in which: said picture of larger area corresponds to a map and a point on said picture displayed at any one time corresponds to the location of the vehicle on said map.

8. A display system according to claim 7 in which said means for altering the locations in the storage means which are addressed alters said locations so as to maintain said point at a fixed position on said picture displayed at any one time.

9. A display system according to claim 8 including means for causing a predetermined direction on said picture displayed at any one time to correspond to the direction in which the vehicle is heading at that time.

10. A display system according to claim 1 in which there are $n^2$ storage devices and said stored data is distributed so that the data representing pixels of each line of each set of n successive lines of said picture of larger area are distributed among a different set of n of the storage devices, the sequence of n storage devices containing data representing successive pixels of a line being full and regular along each line, and the sequence of n sets of storage devices containing data representing the pixels of n successive lines being full and regular throughout said picture.

11. A display system according to claim 10 in which n is equal to 4.

12. A display system according to claim 10 in which said devices are dynamic RAM devices.

* * * * *